Feb. 25, 1941.                R. M. RANEY                 2,232,800
                             STORAGE BATTERY
                          Filed Dec. 27, 1939           3 Sheets-Sheet 1

INVENTOR.
ROBERT M. RANEY
BY Kwis Hudson & Kent
ATTORNEYS

Feb. 25, 1941.  R. M. RANEY  2,232,800
STORAGE BATTERY
Filed Dec. 27, 1939   3 Sheets-Sheet 3

INVENTOR.
ROBERT M. RANEY
BY
Kwis Hudson & Kent
ATTORNEYS

Patented Feb. 25, 1941

2,232,800

UNITED STATES PATENT OFFICE 2,232,800

STORAGE BATTERY

Robert M. Raney, Euclid, Ohio, assignor to Willard Storage Battery Company, Cleveland, Ohio, a corporation of West Virginia Application December 27, 1939, Serial No. 311,180

4 Claims. (Cl. 136—170)

This invention relates to storage batteries and has particular reference to batteries provided with auxiliary covers such as motorcycle batteries.

The principal object of the invention is to provide a battery with an improved form of auxiliary cover which extends entirely over the top of the battery and which, in addition to serving as a dust shield and as a protector for the cell covers and the parts at the top thereof including the filling and venting means and the terminals and cross-connectors, admits of the ready and convenient filling of the cells without danger of overfilling.

It has been proposed heretofore to avoid overfilling of the cells to provide on the underside of the cell cover in line with the filling opening a tubular extension which projects down into the cell to substantially the normal or desired electrolyte level and to provide on the upper side of the cell cover a hollow extension with a vent opening which is spaced from and is independent of the filling plug or cap. The arrangement is such that if the vent opening is closed by one's finger or otherwise the air which is trapped on the underside of the cover prevents the cell from being filled to a level materially above the lower end of the tubular extension through which the water is supplied. In Patent No. 2,169,771 issued on August 15, 1939 in the name of Samuel W. Rolph, the proper electrolyte level is assured in filling without requiring that the one filling the battery close the vent opening with his finger as provision is made in the construction disclosed and claimed in the Rolph patent whereby the filling plug when removed from the filling opening can be utilized to close or seal the vent opening.

In the ordinary motorcycle battery it is not convenient to close the vent opening either by a person's finger or by the vent plug as in the Rolph patent because of the auxiliary cover which in one way or another is clamped to the top of the battery, and so far as I am aware, batteries of this kind have never heretofore been provided with any means to prevent overfilling.

This disadvantage is overcome by the present invention without the necessity of opening or removing the auxiliary cover by equipping the latter with depressible means preferably in the form of soft rubber caps in line with the vent openings of the various cells and so arranged that by depressing the caps the vent openings can be as effectively closed during filling as in the case of a battery not equipped with an auxiliary cover.

The invention may be further briefly summarized as consisting in certain novel details of construction and combinations and arrangements of parts which will be described in the specification and set forth in the appended claims.

In the accompanying sheets of drawings wherein I have shown the preferred embodiment of the invention, Fig. 1 is a vertical sectional view of a battery constructed in accordance with my invention, the section line being taken along the line 1—1 of Fig. 4;

Figures 1, 2:
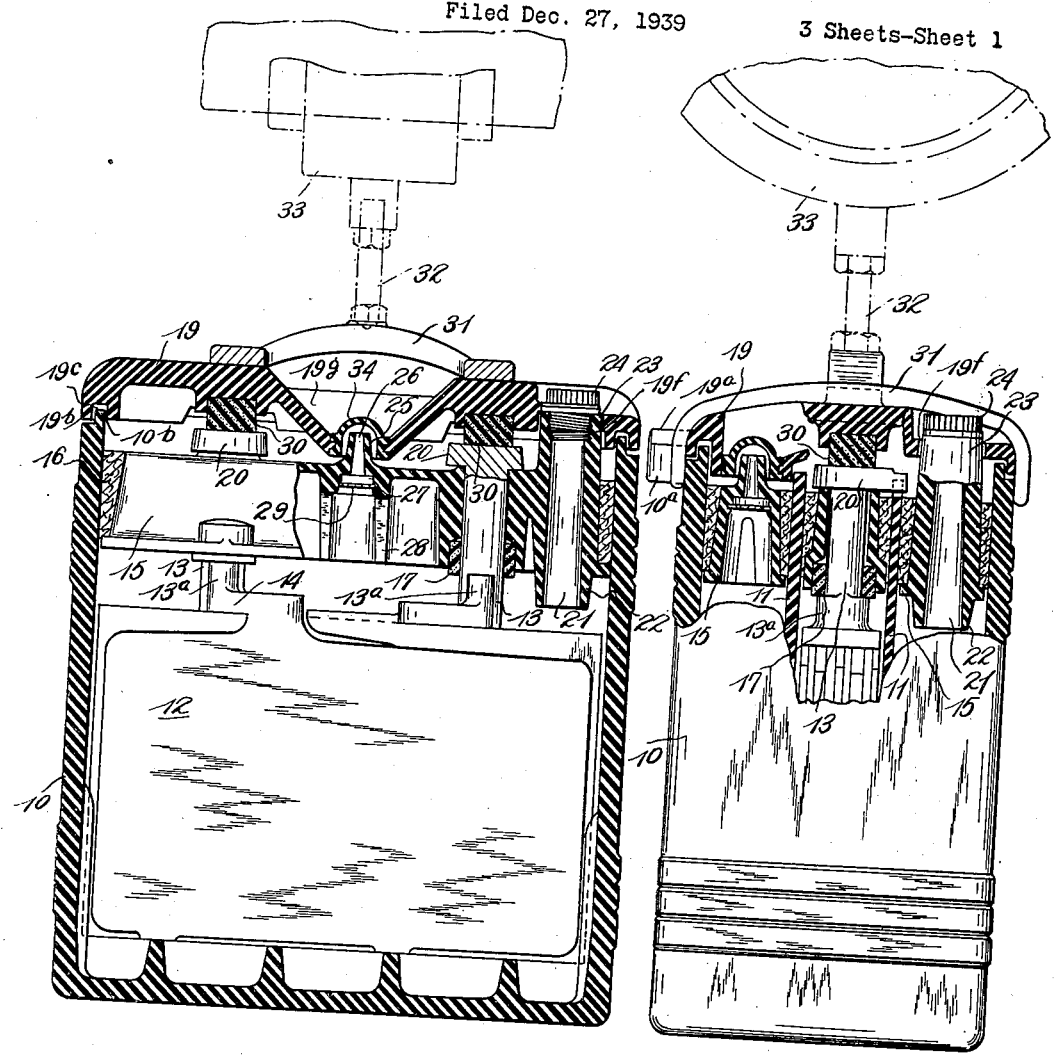
Fig. 2 is a view partly in elevation and partly in section, the section being taken along the irregular line 2—2 of Fig. 4.

Referring now to the drawings, 10 represents a battery box which may be molded from hard rubber or other suitable composition and which is provided in the case of a multi-cell battery with the usual integrally molded partitions 11 dividing the battery box into cell compartments. The battery may have any number of cells, a three-cell battery being here illustrated. Each cell compartment is provided with a battery element 12 from which extend as usual the two terminal posts 13 formed on straps 14 each connected to the plates of one polarity. Each cell is closed by a cell cover 15 which is fitted into the top portion of the compartment and is sealed therein in the customary manner by sealing compound 16. The top of the cover is below the upper edge of the case 10 so as to provide a space for the intercell connectors, the main terminals, and certain other parts to be referred to.

Figure 6:
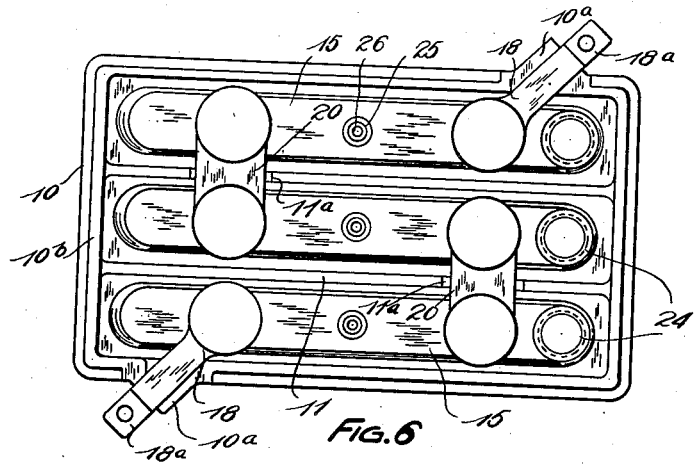
Fig. 6 is a plan of the battery with the auxiliary cover removed.

The two posts 13 of each cell may be sealed in the covers 15 in any of the customary ways, but in this instance they extend through rubber sealing bushings 17 fitted into recesses formed on the undersides of the covers. In this instance, the covers 15 are positioned in the upper portions of the cell compartments by the engagement of the lower ends of the bushings 17 with shoulders 13a formed on the lower portions of the posts 13. By reference to Fig. 6 it will be seen that the terminal posts at two of the diagonally opposite corners of the battery have terminal members 18 lead-burned thereto, these having extensions 18a constituting the main terminals of the battery which project diagonally outward through slots or openings formed partly in extensions 10a of the sides of the case 10 near diagonally opposite corners and partly in extensions 19a of the auxiliary cover 19 to be referred to presently. The other cell posts are lead-burned to intercell connectors 20 the middle portions of which extend through notches 11a formed in the upper portions of the partitions 11.

Referring again to the cell covers 15 which, in this instance, are deeper and narrower than usual cell covers, each of these covers has a filling opening 21 formed in a tubular portion of the cover with a skirt-like extension 22 and on the underside of the cover and extending down to substantially the normal electrolyte level of the cell and with an extension 23 which projects above the top of the cover and is internally threaded near its upper end to receive the threaded shank of a removable filler plug 24. The filling openings 21 with the tubular extensions 22 and 23 for the various cells are arranged in a row near one end of the battery. Additionally, each cover is provided about centrally and on the upper side thereof with an upwardly extending protuberance 25 having a tapered passageway extending therethrough and terminating at its upper end in a small vent opening 26. The lower end of this passageway is enlarged to form a condensing chamber 27, and below this condensing chamber formed on the under or inner side of the cover is a slotted skirt portion 28. The condensing chamber may have one or more perforated baffles 29 extending across the same substantially as the Rolph patent mentioned above. The protuberances 25 with the vent openings 26 are arranged in a row extending transversely of the battery centrally thereof.

Figure 3:
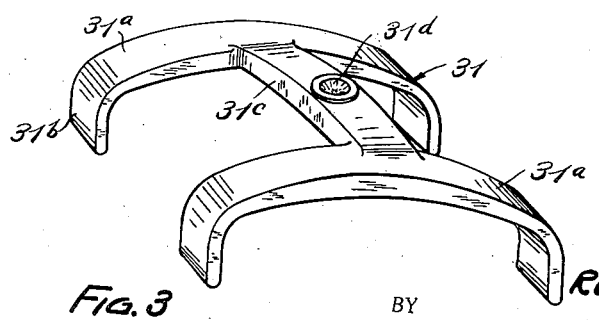
Fig. 3 is a perspective view of a clamp which in this instance is used to fasten the auxiliary cover in place.

Reverting to the auxiliary cover 19 to which reference was made previously, this cover, like the cell covers 15, is preferably molded from hard rubber composition or other suitable material which on curing becomes hard and is inert to the battery electrolyte. This auxiliary cover extends over the entire top of the battery and is provided around its perimeter with a downturned flange 19b which conforms in outline to that of the top of the battery with which it is in telescoping interfitting relation. In this instance, the underside of the flange is provided with a groove 19c which receives a rib 10b formed on the top edge of the battery case 10. Preferably the auxiliary cover and the top of the case are not clamped in direct firm engagement but, instead, a cushion is provided between the underside of the auxiliary cover and the top of the battery proper. In this instance, this cushion consists of soft rubber pads or buttons 30 fitted into recesses molded into the underside of the auxiliary cover and arranged so as to engage the upper ends of the terminal posts of the battery. Preferably the cover is provided with as many of these pads as there are terminal posts in the battery, and since a three-cell battery is here illustrated, the cover here shown has six pads. The auxiliary cover 19 may be secured or clamped in place by any suitable means, but in this instance there is employed a metal clamp 31 which, as illustrated in Fig. 3, is substantially H-shaped having two cover engaging arms 31a which extend transversely over the top of the auxiliary cover and are provided with downturned ends 31b which extend downwardly below the marginal flange of the auxiliary cover and engage opposite sides of the battery case. Additionally, the clamp is provided with a cross-bar 31c which in this instance is provided with a central depressed seat 31d to accommodate the lower end of a cover holding and battery clamping stud 32 adapted to engage a suitable part 33 carried by the motorcycle or forming a part of the frame thereof.

Figure 4:
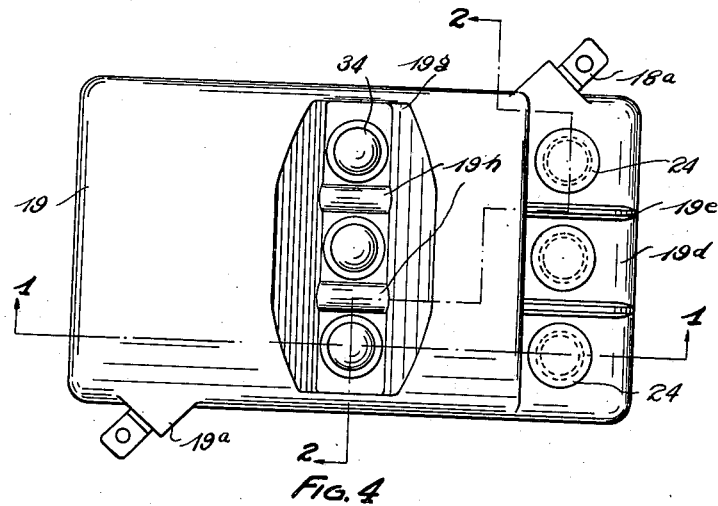
Fig. 4 is a plan view of the battery with the auxiliary cover in place.
Figure 5:
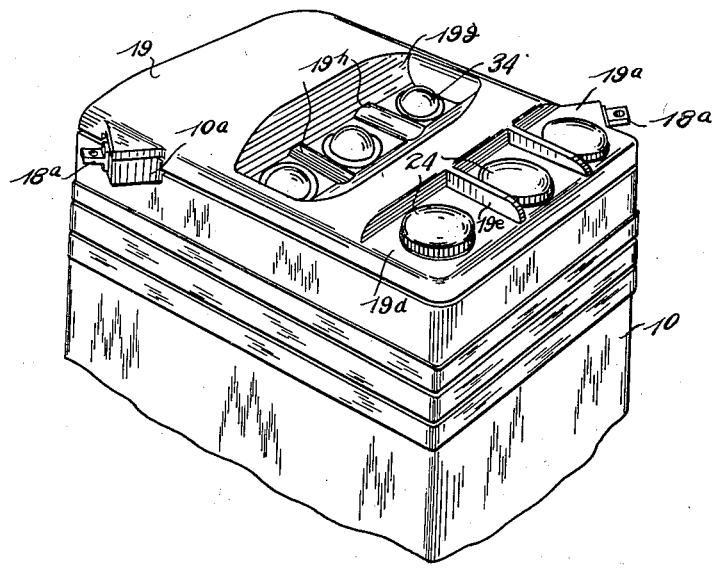
Fig. 5 is a perspective view of the upper part of the battery.

It is desirable, of course, that access be had to the filler plugs without disturbing the auxiliary cover 19 or the clamp 31 therefor, and, accordingly, the auxiliary cover is provided with a row of openings 19f to accommodate the upper ends of the tubular extensions 23 of the filling openings or at least the knurled portions of the filler plugs 24 which are arranged at one end of the battery. At this end of the battery, the auxiliary cover has a lowered flattened portion 19d with ribs 19e (Figs. 4 and 5) extending between the plugs, thus providing protecting walls which reduce the likelihood of injury to the protruding portions of the plugs.

Figure 7:
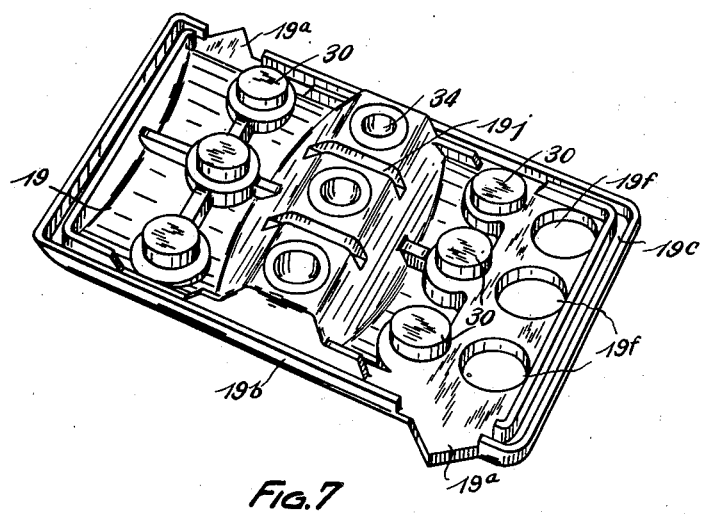
Fig. 7 is a perspective view of the underside of the auxiliary cover.

Coming now to the most important feature of the present invention, i. e., the provision of means whereby overfilling of the cells can be avoided notwithstanding the fact that the top of the battery is entirely covered by an auxiliary cover, it will be noted that the middle portion of the auxiliary cover has on its upper side a trough-like depression 19g extending transversely across the same, this depression having sloping sides, upright ends located adjacent the downturned margin of the auxiliary cover, and a substantially flat bottom located below the top portions of the vent protuberances 25. The bottom of this trough-like depression has a series of openings molded therein one for each cell of the battery, and these openings are closed by soft rubber depressible dome-shaped caps 34 which are held in place by suitable interfitting grooves and ribs formed respectively on the base portions of the caps and the walls of the holes which receive them. The vent protuberances 25 extend up into these dome-shaped caps and the vent openings 26 are slightly below the top portions of the caps, as clearly shown in Figs. 1 and 2. The dome-shaped caps 34 are spaced apart by ribs 19h (Figs. 4 and 5) which extend across the lower part of the depression 19g. These ribs form the tops of slots 19j (Fig. 7) molded in and extending across the underside of the depression 19g, these slots receiving the upper portions of the partitions 11 where they project above the sealing compound 16 and above the upper sides of the cell covers 15. As the vent protuberances 25 project freely up into the hollow caps 34, the latter normally do not interfere with the venting of the cells, the venting taking place through the vent openings 26 into the hollow caps 34, then into the space between the top of the battery and the auxiliary cover and out from this space around the edges of the auxiliary cover and the filling openings.

When it is desired to fill the cells, the filler plugs will be removed, and as water is being supplied to a cell, the operator presses down the soft rubber cap 34 for that cell so as to seal the vent opening during filling, and this, of course, traps air on the underside of the cell cover and prevents overfilling. It will be understood that water will be supplied until the operator sees that it is rising in the filling opening. Thereupon, when the operator releases the rubber cap 34 so as to break the seal of the vent opening, the water in the filling opening will flow down into the cell and the electrolyte will assume the desired predetermined level. This is repeated for each cell while it is being filled, with the result that overfilling is prevented notwithstanding the presence of the auxiliary cover. Thus the filling is done as conveniently as though the top of the battery were not covered by the auxiliary cover.

In conclusion, it might be stated that the clamp 31 does not interfere with the depressing of the rubber caps 34 since the clamping arms 31'a engage the auxiliary cover on opposite sides of the trough-like depression 19g, and because of the fact that the caps are located in the base of the depression coupled with the fact that the central cross-arm 31c of the clamp is narrow and is bowed upwardly, easy access is afforded to all the caps 34 including the cap for the middle cell.

While I have shown the preferred construction, I do not desire to be confined to the precise details illustrated but aim in my claims to cover all modifications which do not involve a departure from the spirit and the scope of the invention.

Having thus described my invention, I claim:

1. A storage battery having a plurality of cell compartments, cell covers therefor, and an auxiliary cover extending over the battery, the cell covers having normally closed filling openings and having sleeve-like extensions in line with said filling openings and extending down into the cells to substantially the normal electrolyte level, and said cell covers having on the upper sides thereof hollow upward extensions terminating in relatively small vent openings, the auxiliary cover having openings for affording access to the filling openings and having a depressed portion with openings in the base thereof and with soft rubber caps forming closures for said openings, said caps being arranged above and in line with said extensions and the vent openings thereof and adapted to be depressed to close the vent openings while the cells are being filled.

2. An auxiliary cover adapted to be applied to the top of a storage battery provided adjacent one end thereof with a series of openings adapted to receive filler plugs for the different cells of the battery and provided with a trough-like depressed portion with openings in the bottom thereof, and yieldable depressible means carried by the bottom of said depressed portion and closing said last mentioned openings.

3. In a storage battery, a container having a cell compartment, a cell cover sealed in the compartment, a battery element in the compartment having terminals extending through and sealed in the cell cover, said cell cover having a normally closed filling opening with an imperforate sleeve-like extension extending down from the lower side of the cover to substantially the normal electrolyte level and having also a normally open vent opening separate from the filling opening, and an auxiliary cover secured to the top of the battery and serving as a cover and protector for the cell cover and the parts carried thereby, said auxiliary cover having an opening affording access to the filling opening of the cell cover and having depressible means above the vent opening of the cell cover and adapted to be depressed to close said vent opening during the filling of the cell.

4. In a storage battery, a container having a plurality of cell compartments, cell covers sealed in the compartments, battery elements in the compartments having terminals extending through and sealed in the cell covers, said cell covers having normally closed filling openings with imperforate sleeve-like extensions extending down from the lower sides of said covers to substantially the normal electrolyte level and having also normally open vent openings separate from the filling openings, said filling openings being arranged in a row extending across the battery near one end thereof and the vent openings being arranged in a row extending across the battery intermediate the ends thereof, and an auxiliary cover secured to the top of the battery and serving as a covering and protector for the different cell covers and the parts carried thereby, said auxiliary cover having adjacent to one end thereof a series of openings affording access to the filling openings of the cell covers and having inwardly from said end depressible means above the vent openings of the cell covers adapted to be depressed to close the vent openings of the different cells during the filling thereof.

ROBERT M. RANEY.